United States Patent
Chen et al.

(10) Patent No.: US 9,686,069 B2
(45) Date of Patent: Jun. 20, 2017

(54) ADAPTIVE MIMO SIGNAL DEMODULATION USING DETERMINANT OF COVARIANCE MATRIX

(71) Applicant: ZTE Canada Inc., Toronto (CA)

(72) Inventors: Dayong Chen, Kitchener (CA); Yiwen Liu, Waterloo (CA)

(73) Assignee: ZTE Canada Inc., Toronto (CA)

( * ) Notice: Subject to any disclaimer, the term of this patent is extended or adjusted under 35 U.S.C. 154(b) by 0 days.

(21) Appl. No.: 15/161,632

(22) Filed: May 23, 2016

(65) Prior Publication Data

US 2016/0344459 A1    Nov. 24, 2016

Related U.S. Application Data

(60) Provisional application No. 62/165,860, filed on May 22, 2015.

(51) Int. Cl.
| | |
|---|---|
| H04B 7/10 | (2006.01) |
| H04L 5/00 | (2006.01) |
| H04B 7/08 | (2006.01) |

(52) U.S. Cl.
CPC ........... *H04L 5/006* (2013.01); *H04B 7/0854* (2013.01); *H04B 7/0868* (2013.01); *H04L 5/005* (2013.01); *H04L 5/0051* (2013.01); *H04L 5/0073* (2013.01)

(58) Field of Classification Search
CPC .. H04B 7/0854; H04B 7/0857; H04B 7/0626; H04B 7/0842; H04B 7/0851;
(Continued)

(56) References Cited

U.S. PATENT DOCUMENTS

| | | | |
|---|---|---|---|
| 2008/0181095 A1* | 7/2008 | Zangi | H04B 7/0845 370/208 |
| 2008/0181342 A1 | 7/2008 | Cho et al. | |
| 2013/0022160 A1 | 1/2013 | Lee et al. | |

FOREIGN PATENT DOCUMENTS

WO    2016/082040 A1    6/2016

OTHER PUBLICATIONS

Boariu, A., et al., "The Cholesky-Iterative Detector: A New Multiuser Detector for Synchronous CDMA Systems," IEEE Communications Letters, 4(3):77-79, Mar. 2000.

* cited by examiner

*Primary Examiner* — Rahel Guarino
(74) *Attorney, Agent, or Firm* — Perkins Coie LLP

(57) ABSTRACT

Techniques to adaptively apply interference rejection combining (IRC) for signal demodulation, include estimating an impairment covariance matrix, computing an interference correlation metric based on the determinant of the estimated impairment covariance matrix, selecting an interference correlation threshold, comparing the interference correlation metric with the threshold to determine if IRC should be used for demodulation, estimating a desired signal covariance matrix, computing a desired signal correlation metric based on the determinant of the desired signal covariance matrix, selecting desired signal correlation threshold, comparing the desired signal correlation metric with the desired signal correlation threshold to select one of the supported detection algorithms, filtering the received signal and associated channel matrix, and passing the whitened signal and channel matrix to the selected detection algorithm to generate estimates of code bits, if IRC is enabled. If IRC is disabled, no whitening is applied to the received signal and channel matrix.

20 Claims, 13 Drawing Sheets

(58) Field of Classification Search
CPC ... H04B 1/7097; H04B 1/7105; H04J 11/005; H04J 11/0046; H04J 11/0026; H04J 11/0036; H04W 72/082; H04L 5/0073; H04L 25/03993; H04L 25/03299; H04L 27/2649; H04L 25/0228
USPC ....... 375/346, 347, 340, 349; 455/296, 63.1, 455/278.1, 114.2, 226.1
See application file for complete search history.

|       | QPSK | 16QAM | 64QAM |
|-------|------|-------|-------|
| CRS   | $LUT_{11}$ | $LUT_{12}$ | $LUT_{13}$ |
| DM-RS | $LUT_{21}$ | $LUT_{22}$ | $LUT_{23}$ |

$LUT_{ij}$

| Threshold | $SINR_1$ | $SINR_2$ | $SINR_3$ | ... | $SINR_N$ |
|-----------|----------|----------|----------|-----|----------|
|           | $T_{ij}^1$ | $T_{ij}^2$ | $T_{ij}^3$ | ... | $T_{ij}^N$ |

FIG. 6

ADAPTIVE MIMO SIGNAL DEMODULATION USING DETERMINANT OF COVARIANCE MATRIX

CROSS REFERENCE TO RELATED APPLICATIONS

This patent document claims the benefit of priority of U.S. Provisional Patent Application No. 62/165,860, filed on May 22, 2015. The entire content of the before-mentioned patent application is incorporated by reference as part of the disclosure of this document.

OTHER RELATED APPLICATIONS

This patent document is also related to International Patent Application No. PCT/CA2015/051234, filed on Nov. 25, 2015, which claims priority to U.S. Provisional Patent Application No. 62/085,469, filed on Nov. 28, 2014, the entirety of both of which is incorporated by reference herein.

TECHNICAL FIELD

The present document relates to wireless communication, and in one aspect, to signal processing performed in a wireless signal receiver.

BACKGROUND

Recent years has seen a significant growth in wireless communication. As the number of wireless devices and applications running on the wireless devices goes up, so does the demand for data bandwidth in wireless communication networks. To meet this growing demand for high performance wireless devices and networks, complexity of next generation wireless networks and devices is expected to significantly increase over the currently deployed wireless devices.

SUMMARY

Techniques for receiver-side processing of signals to suppress impairments and recover a desired signal are disclosed. In one aspect, determinant of an estimated impairment and a desired signal covariance matrix is used for determining which one of multiple possible demodulation techniques is to be used to demodulate received signal and recover information bits.

In one example aspect, a signal demodulation method implemented in a receiver includes receiving a radio frequency (RF) signal representing a combination of a desired signal and interference, estimating, using a reference signal from the received signal, an estimated impairment covariance matrix, determining an interference correlation metric by computing a value of determinant of the estimated impairment covariance matrix, selecting an interference correlation threshold based on at least one of a type of the reference signal used for estimating the impairment covariance matrix, modulation used by the desired signal and an estimate of a signal to interference plus noise ratio (SINR), determining, by comparing the interference correlation metric with the interference correlation threshold, whether to use interference rejection combining (IRC) for demodulation of the desired signal, and selecting, based on a value of determinant of an estimated desired signal covariance matrix, a signal detection algorithm for use by the receiver during demodulation of the desired signal.

In another example aspect, a wireless signal receiver apparatus to adaptively apply different signal processing techniques for signal demodulation is disclosed. The apparatus includes an impairment covariance matrix estimator that estimates an impairment covariance matrix based on signals received by the apparatus and known reference symbol sequence, wherein the received signals include a desired signal component and an impairment component, an IRC control unit to decide whether to use IRC to demodulate the signals received by the apparatus based on a determinant of the impairment covariance matrix, a desired signal covariance matrix estimator that computes a desired signal covariance matrix, a detection algorithm selector to choose one of the plurality of detection algorithms based on the determinant of the desired signal covariance matrix, a whitening filter generation unit that generates coefficients of a whitening filter based on an estimate of the impairment covariance matrix, wherein the whitening filter is for de-correlating the impairment component of the received signal, a whitening filter through which the received signal is filtered, a plurality of standard detection algorithms or, alternatively, separate detection algorithms supporting both standard and IRC mode operation, and a control module to route the IRC enable/disable control signal to the relevant points of the demodulator to either enable or disable IRC as part of the demodulation process.

These, and other, aspects are disclosed in the present document.

BRIEF DESCRIPTION OF THE DRAWINGS

FIG. 6 shows an example of lookup tables containing interference correlation thresholds.

DETAILED DESCRIPTION

Due to denser cell deployment to keep up with the exponential growth in wireless communication traffic, inter-cell interference has become a dominant factor for achieving higher network capacity. To achieve higher spectral efficiency, a modern wireless receiver often employs signal demodulation algorithms capable of mitigating inter-cell interference.

In recent years, the use of multiple antennas at a transmitter and/or a receiver, sometimes collectively called Multiple Input, Multiple Output (MIMO) systems, has become a pragmatic and cost-effective approach in making high data rate wireless links a reality. To further increase system capacity, wireless service providers deploy networks employing one-to-one frequency reuse. The frequency reuse, however, could result in an increase in interference, causing undesirable effects such as lower data throughput, poor speech quality, call dropout, etc. As a result, effective interference suppressing algorithms in the wireless MIMO receivers have become increasingly important to improve user throughput, especially in cell-edge regions where signals from neighboring cells may overlap with the desired signal.

An Interference Rejection Combining (IRC) implementation may make use of correlation of interference across multiple receiver antennas to reduce the effect of the interference on the desired signal. For example, an IRC receiver based on minimum mean square error criterion, referred to as MMSE-IRC advanced receiver, was introduced in Release 11 of the 3GPP LTE (3rd Generation Partnership Project Long Term Evolution) Advanced standard (LTE-A). Per LTE-A Release 11, a receiver is to meet enhanced requirements for radio signal reception in which the signal is impaired not only by thermal noise but also interference from neighbor cells. In Release 12, the IRC technique may be integrated into detection algorithms based on other criteria such as maximum likelihood as well.

Figure 1:
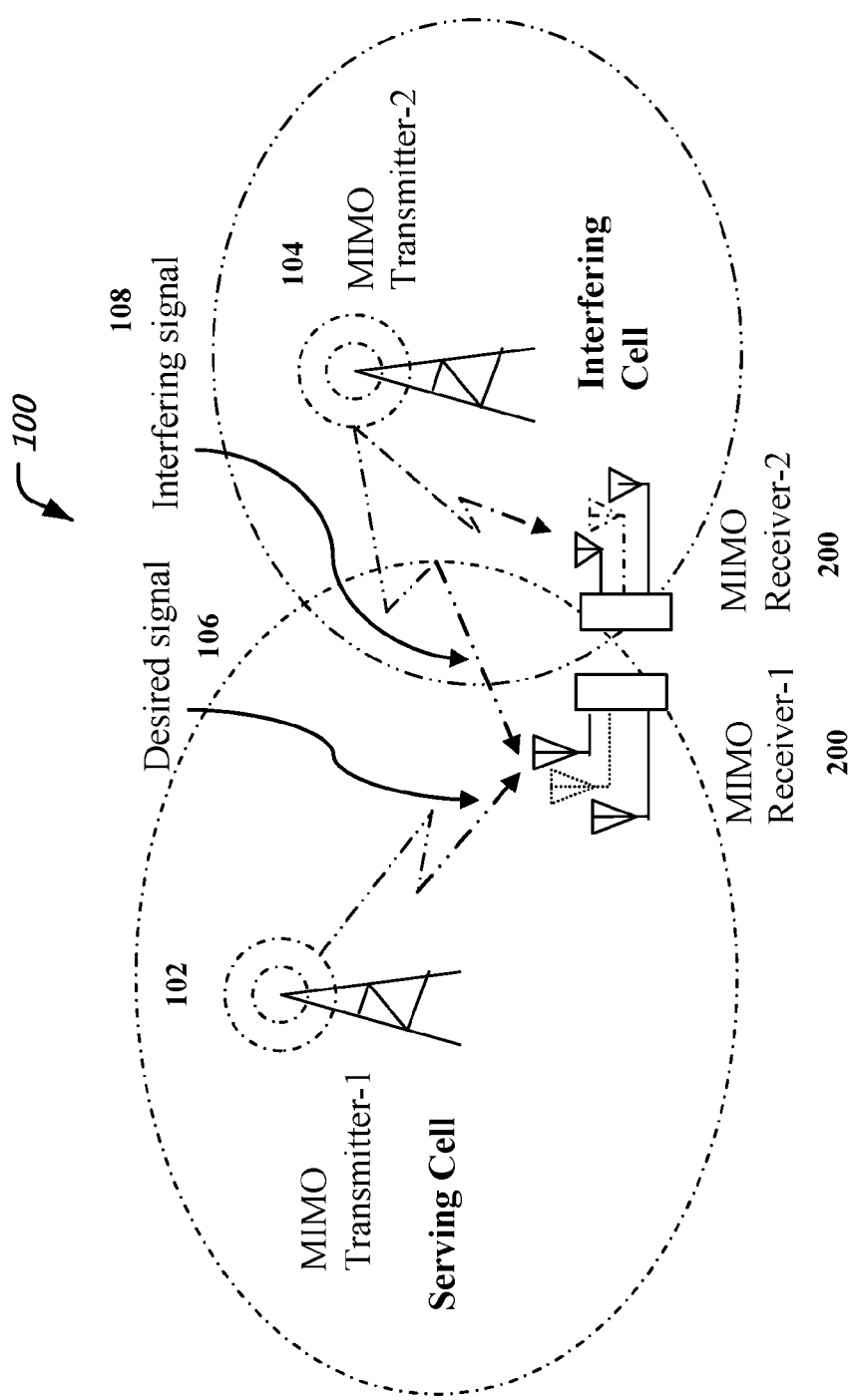
FIG. 1 shows an example of a wireless communication system in which inter-cell interference is present.

FIG. 1 illustrates an example wireless system 100 with a desired signal 106 transmitted from a serving cell base station 102 to a desired user device 200 and an interference signal 108 transmitted from a neighbor cell 104. The desired signal may represent, e.g., a downlink or forward communication channel from a base station. In the system 100, there may in general be multiple interference signals that reach the user device 200 with different power levels. The vector of signals received at $N_R$ receiving antennas of the considered user device 200 can be expressed as $$y = Hx + Gu + n \quad \text{Eq. (1)}$$

where $x=[x_0, x_1, \ldots x_{N_T-1}]^T$ is a transmit symbol vector from the serving cell 102 to the user device 200, H is a $N_R \times N_T$ channel matrix between serving cell 102 and user device 200, u is a transmit symbol vector which reaches the user device 200 through channel matrix G and n is a $N_R \times 1$ AWGN (additive white Gaussian noise) noise vector. The received signal consists of the desired signal Hx interference Gu and white noise n. The sum of interference and noise v=Gu+n is sometimes called impairment.

Each entry $x_k$ of a transmit symbol vector is drawn from a constellation with $2^Q$ signal points where Q is the number of bits per modulation symbol. Each symbol $x_k$ corresponds to a vector of Q code bits $c_k=[c_{k,0}, c_{k,1}, \ldots c_{k,Q-1}]$. The task of a demodulator is to estimate the log-likelihood-ratio (LLR) for each of the $N_T Q$ code bits in transmit symbol vector x with the best possible quality where an LLR (Log Likelihood Ratio) is defined as:

$$L_{k,j} = \ln \frac{P(c_{k,j} = 0 \mid y)}{P(c_{k,j} = 1 \mid y)}. \quad \text{Eq. (2)}$$

A positive LLR represents a "0" bit and a negative LLR represents a "1" bit. The magnitude of an LLR indicates the confidence level of a received 0 or 1 bit. The demodulation quality is measured by the signs and magnitudes of the LLRs of a codeword. To have a good demodulation quality may mean that most (or a majority of) LLRs have correct signs and large magnitudes, which translates into high decoding success probability and data throughput, whereas bad demodulation quality may mean the opposite.

Inter-cell interference is a major factor that degrades the demodulation quality, especially at cell edge regions where interference power level is typically much higher than that of thermal noise. It is thus useful to apply interference mitigation techniques in wireless receivers 200 in order to improve the network capacity.

There are broadly three different inter-cell interference mitigation techniques, including interference cancellation (IC), multi-user maximum-likelihood (MU-ML) joint detection of desired signal and interference and interference rejection combining (IRC).

An IC receiver reconstructs the interferer waveform $\hat{G}\hat{u}$ and subtracts it from the received signal before demodulating the desired signal. An MU-ML receiver jointly detects x and u. Since both IC and MU-ML receiver need to estimate an interference channel matrix and detect interferer modulation scheme, the receiver complexity is greatly increased compared to the complexity of a conventional receiver that operates without interference mitigation mechanism. In addition, both an IC and an MU-ML receiver are sensitive to synchronization errors between the serving and neighbor cell. In contrast, an IRC receiver only has to estimate the impairment covariance matrix, which is of much lower complexity than IC and MU-ML approach. Furthermore, no synchronization between serving and neighbor cell is assumed or required, which makes IRC very robust against any synchronization errors.

Figure 2:
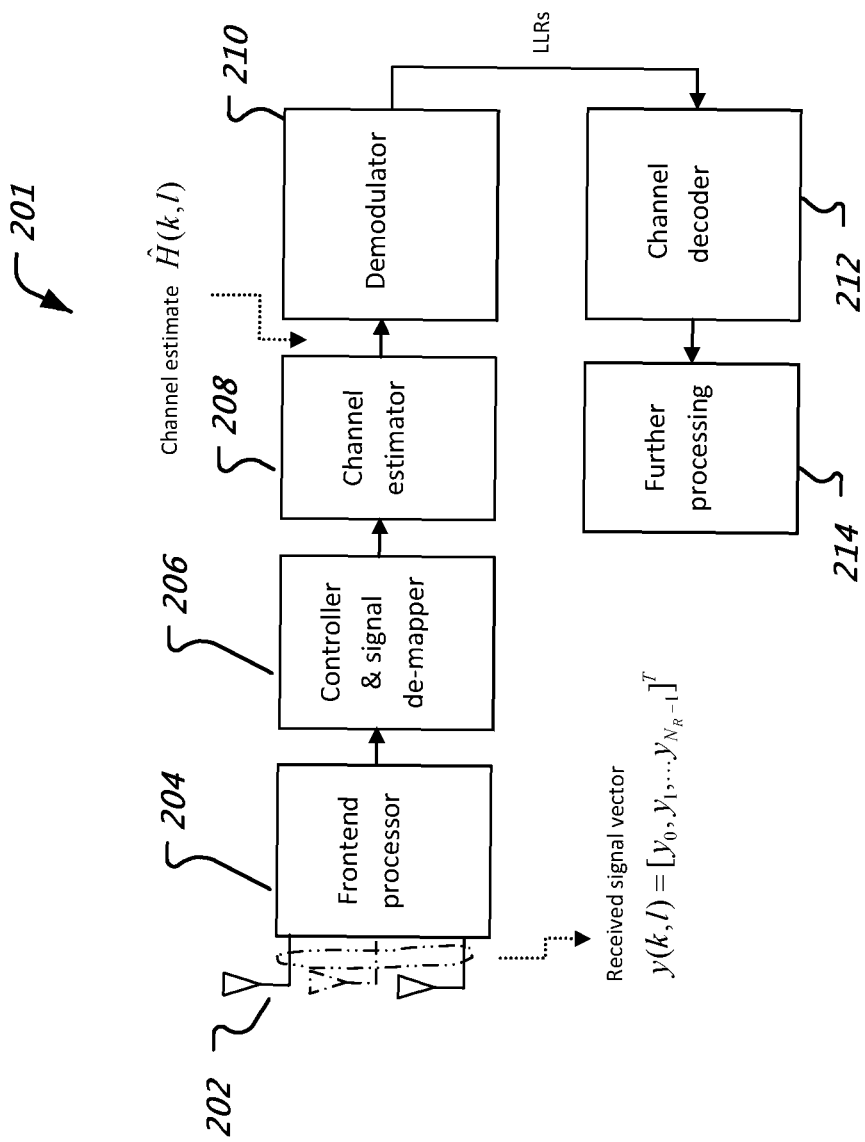
FIG. 2 shows an example of a multi-input, multi-output (MIMO) receiver.

FIG. 2 shows an example of a receiver 201 (which may be similar to the receiver 200 depicted in FIG. 1), comprising two or more receiving antennas 202 through which both the desired signal and interference enter the receiver 200, a frontend processor module 204 coupled to the receiving antennas 202 to process the received signals into the form that can be used by the subsequent processing blocks, a controller & signal de-mapper 206 to de-multiplex received signals into separate physical channels and extract known reference signals for parameter estimation, a channel estimator 208 to estimate channel matrix for each subcarrier as well as other parameters including noise variance and impairment covariance matrix for each resource block, a demodulator 210 to calculate log-likelihood-ratios (LLRs) for the code bits included in each symbol vector transmitted on each data carrying subcarrier, a turbo/convolutional decoder 212 to recover information bits from the LLRs of the code bits that make up a codeword and finally a block 214 for further processing of the information bits.

Figure 3:
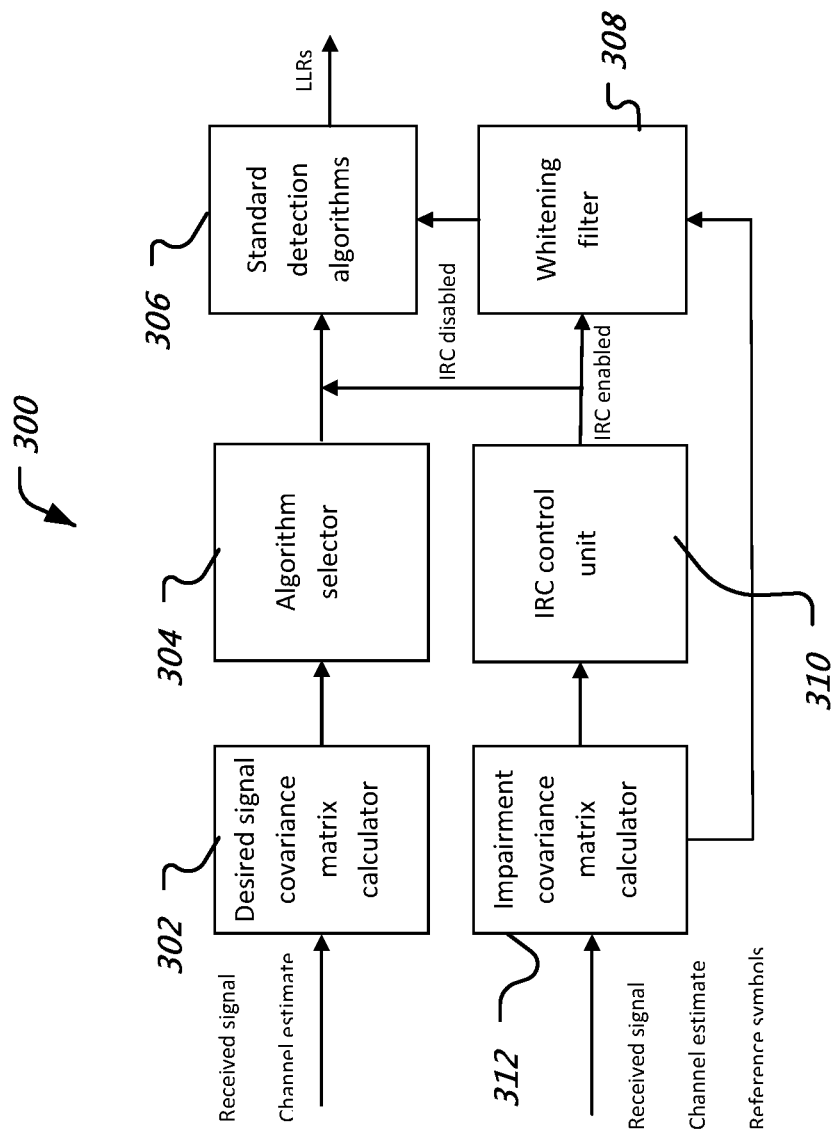
FIG. 3 shows an example of a block diagram of a demodulator that adaptively applies interference rejection combining (IRC) and adaptively selects a detection algorithm for signal demodulation according to some embodiments based on the unified IRC receiver structure, described herein.

FIG. 3 shows an example receiver apparatus 300 which uses a unified IRC structure. The apparatus 300 comprises a covariance matrix calculator 302 to estimate impairment covariance matrix, an IRC control unit 310 to enable or disable IRC based on an interference correlation metric derived from the estimated impairment covariance matrix 312, a desired signal covariance matrix calculator 302, an algorithm selector 304 to select one of the detection algorithms (for example, MMSE or ML algorithm) based on a desired signal correlation metric, a whitening filter 308 (including a whitening filter generation unit) and multiple standard detection algorithms 306. Additional details of the unified IRC structure are also provided in the PCT patent application PCT/CA2015/051234, entitled "Unified Interference Rejection Combining," filed on Nov. 25, 2015 and having priority date at least Nov. 28, 2014. The entirety of this PCT patent application is incorporated by reference herein. In addition, FIG. 13, discussed later, also shows some example embodiments of a unified IRC structure implemented at the receiver-side.

Figure 4:
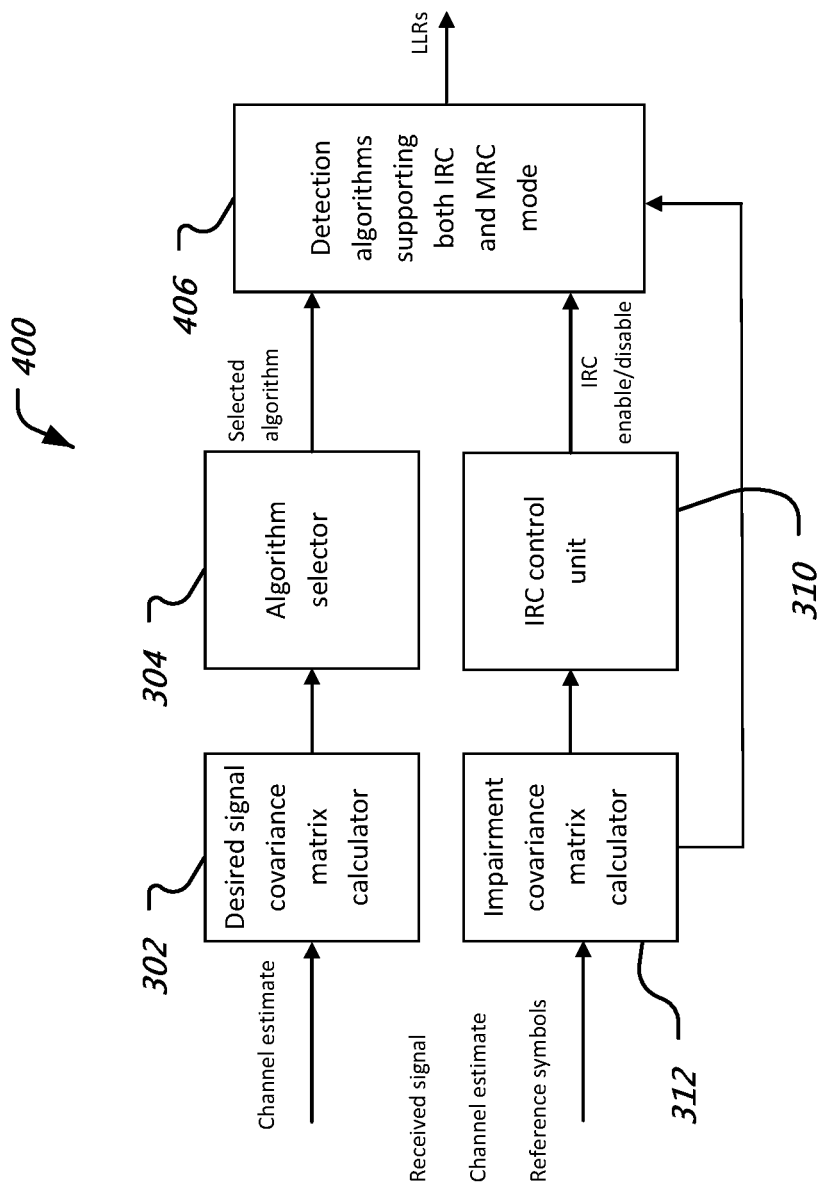
FIG. 4 shows an example of a demodulator that adaptively applies IRC and adaptively selects a detection algorithm for signal demodulation according to some embodiments based on the receiver structure with separate detection algorithms supporting both IRC and non-IRC mode, as described herein.

FIG. 4 shows an example demodulator 400 which uses individual detection algorithms that support both IRC and non-IRC mode operation.

A demodulator typically supports different detection algorithms that have different complexity and performance characteristics. For example, a MIMO signal with two or more parallel data streams can be demodulated using a linear detection algorithm based on MMSE criterion. Alternatively, the same MIMO signal can be demodulated using a non-linear detection algorithm based on ML criterion. The complexity of MMSE algorithm is much lower than that of ML algorithm whose complexity scales exponentially with the number of transmitted streams and modulation order. The performance gap between ML and MMSE depends on the spatial correlation of the desired signal; if the spatial correlation of desired signal is low, the MMSE algorithm has practically the same performance as the ML algorithm, even though the complexity of MMSE algorithm is much lower, in which case it is very desirable to use MMSE algorithm. With increased spatial correlation of the desired signal, however, the performance of the ML algorithm becomes far superior to that of the MMSE algorithm, in which case it is very desirable to use ML algorithm.

A traditional or standard detection algorithm models the impairment vector as i.i.d. AWGN, which means the impairment covariance matrix is assumed to be an identity matrix scaled by the noise variance:

$$R = E\{w w^H\} = \sigma^2 I_{N_R}.$$  Eq. (3)

An IRC detection algorithm utilizes the correlation among interference signals received on different receiving antennas to suppress the interference. In general, the more correlated the interference signal, the larger is the IRC gain. The MMSE-IRC and ML-IRC algorithm can be implemented by replacing the AWGN model with an estimated impairment covariance matrix. The IRC gain, e.g., MMSE-IRC over MMSE or ML-IRC over ML, depends on the interference condition. Simulations show most IRC gains are achieved at cell edge regions, whereas using IRC in cell center area will typically cause a performance loss. The degradation is caused by the inaccuracy of the estimated impairment covariance matrix. While a standard detection algorithm suffers only from channel estimation error, an IRC detection algorithm suffers from both channel and impairment covariance estimation errors. It is therefore useful to dynamically switch IRC on or off for demodulation, depending on the interference condition.

Figure 13:
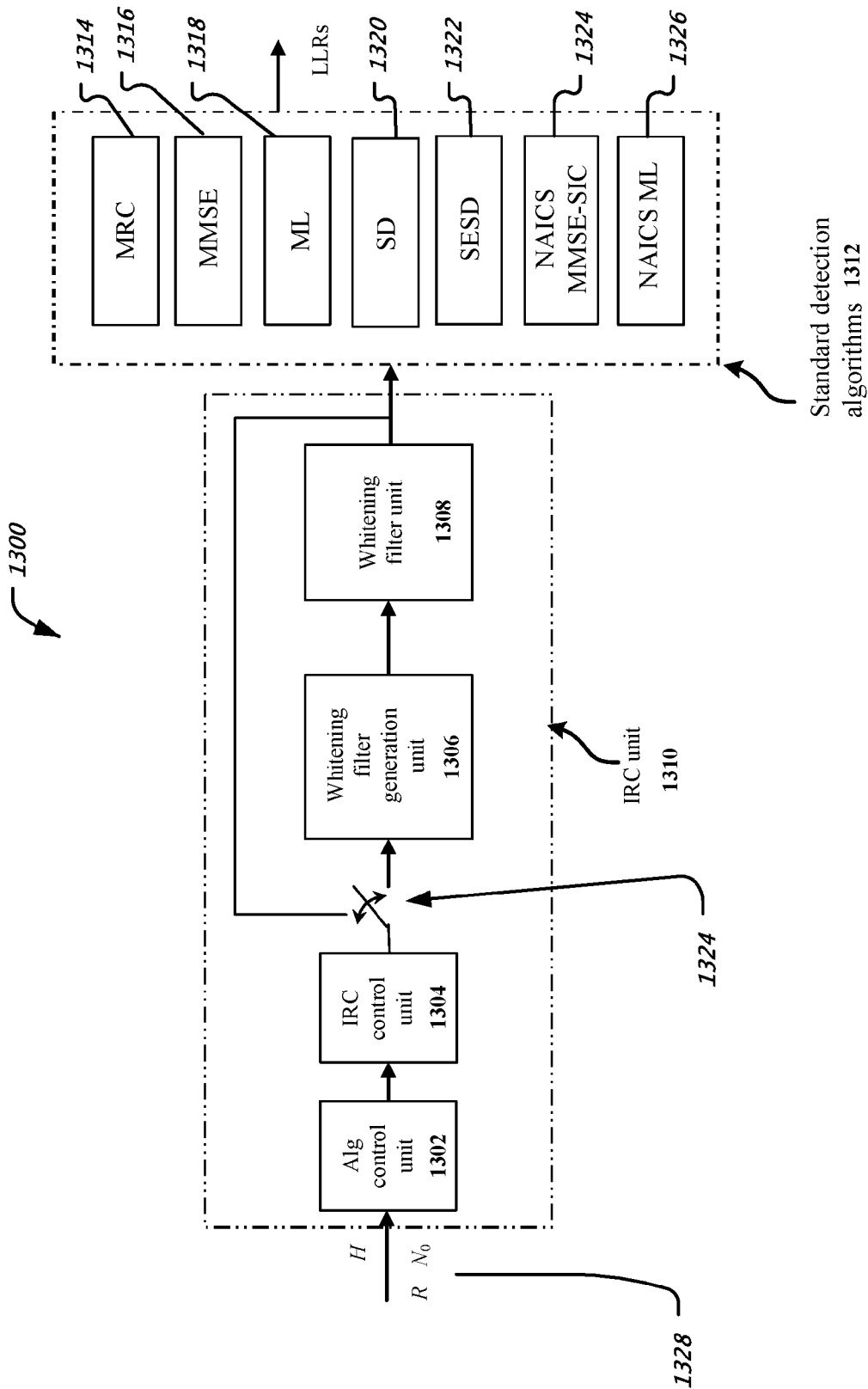
FIG. 13 shows an example of a unified IRC receiver structure.

Thus, a demodulator preferably supports not only multiple detection algorithms, but also the IRC and non-IRC modes for each of the algorithms where non-IRC mode corresponds to using i.i.d. AWGN impairment model. In some embodiments, one way of achieving this duality is to implement IRC functionality separately within each detection algorithm. A more efficient way, which is disclosed in PCT/CA2015/051234, incorporated by reference herein, and the unified IRC architecture described in FIG. 13, is to place a whitening filter in front of the standard detection algorithms supported by the demodulator. IRC demodulation is done by first whitening the received signal (and the channel matrix) and passing the results to one of the standard detection algorithms. As described in PCT/CA2015/051234, and FIG. 13 herein, the two methods of implementing IRC can be mathematically equivalent. Whether the first or the second IRC switching method is implemented, the demodulator still has a switch to either include IRC or bypassing it for signal demodulation.

Figure 5:
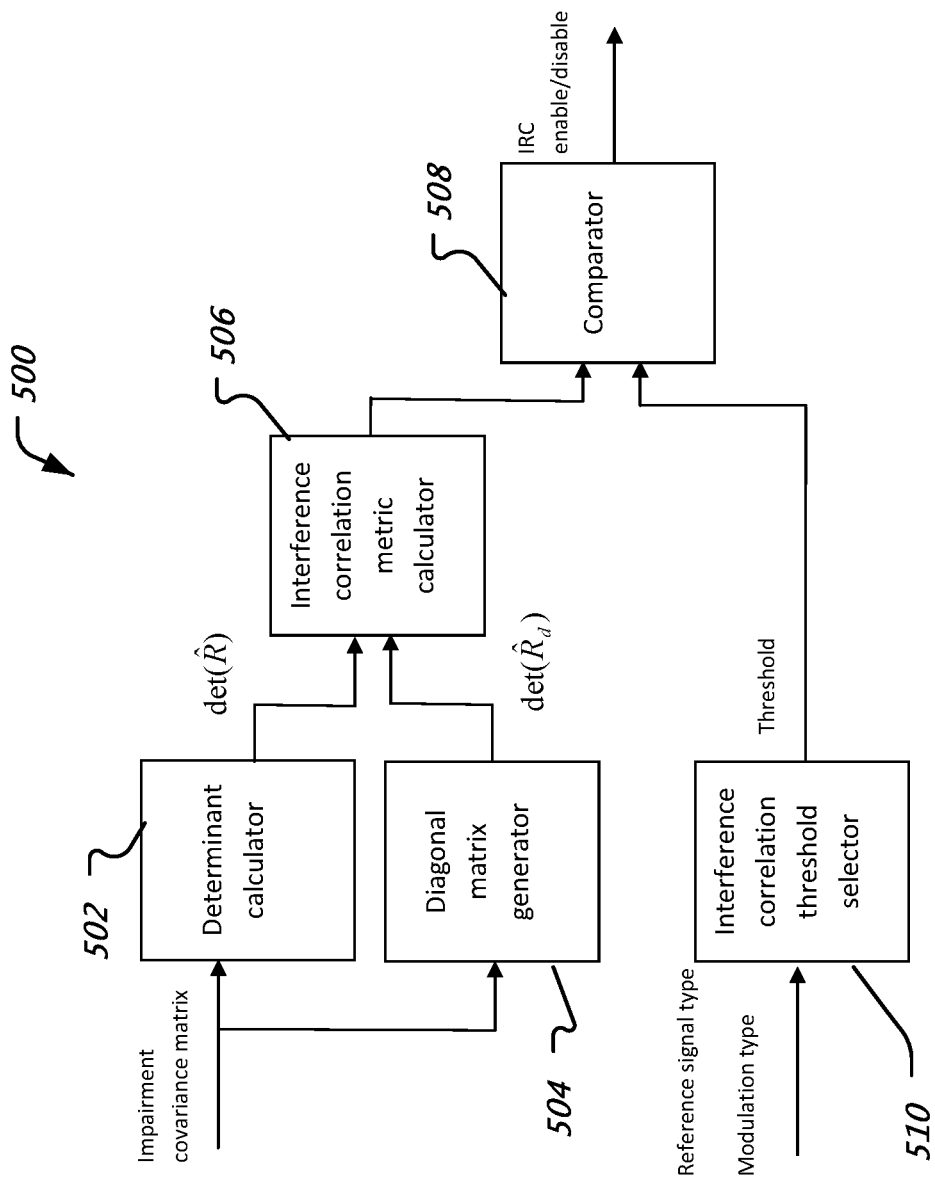
FIG. 5 shows an example of an IRC control unit according some embodiments.

FIG. 5 shows an example of an IRC control unit 500, comprising a determinant calculator 502, a diagonal matrix generator 504, an interference reduction metric calculator 506, a threshold selector 510 and a comparator 508. The interference reduction metric calculator 506 uses the determinant of the estimated impairment covariance matrix to compute a metric that is related to the interference correlation. The threshold selector 510 chooses one of the pre-determined threshold values based on one or more of the type of reference signals used to estimate impairment covariance matrix, the modulation scheme used by the desired signal and estimated signal to interference and noise (SINR) ratio, and the comparator 508 compares the interference correlation metric with the selected threshold to determine if IRC should be used. If IRC is enabled, a whitening filter may be generated from the impairment covariance matrix, the received signal and channel matrix may be passed to the whitening filter to de-correlate impairment samples and the filtered signal and channel matrix may be passed to the selected standard algorithm for demodulation. If however IRC is disabled, the received signal and channel matrix may be passed directly to the selected standard detection algorithm.

In FIG. 5, an example workflow or process of interference correlation metric is illustrated. In some embodiments, the determinant calculator 502 computes determinant of the impairment covariance matrix $\hat{R}$. Then a diagonal matrix $\hat{R}_d$ having the same diagonal elements as $\hat{R}$ is generated by extracting the main diagonal elements of $\hat{R}$. The interference reduction metric $M_{IR}$ can be computed conceptually as the ratio between the determinant of $\hat{R}$ and the determinant of $\hat{R}_d$ as follows:

$$M_{IR} = \frac{\det(\hat{R})}{\det(\hat{R}_d)}$$  Eq. (4)

To avoid the division operation in practical implementations, the determinant ratio need not be calculated explicitly since the ratio is compared with a threshold $T_{IR}$; IRC is used if the ratio is smaller than the threshold and this criterion is equivalent to $$\det(\hat{R}) < T_{IR} \det(\hat{R}_d)$$  Eq. (5)

To see why the determinant ratio defined above is related to the interference correlation, consider an ideal 2×2 impairment covariance matrix which is defined by (Eq. 6), assuming that the impairment vector $v = [v_0, v_1]^T$ is a stationary random process:

$$R = \begin{bmatrix} r_{0,0} & r_{0,1} \\ r_{1,0} & r_{1,1} \end{bmatrix} = \begin{bmatrix} E\{v_0 v_0^*\} & E\{v_0 v_1^*\} \\ E\{v_1 v_0^*\} & E\{v_1 v_1^*\} \end{bmatrix} = \begin{bmatrix} \sigma_{u_0}^2 + \sigma^2 & E\{u_0 u_1^*\} \\ E\{u_1 u_0^*\} & \sigma_{u_1}^2 + \sigma^2 \end{bmatrix} \quad \text{Eq. (6)}$$

where $\sigma_{u_0}^2 = E\{|u_0|^2\}$ is the interference power on the first antenna, $\sigma_{u_1}^2 = E\{|u_1|^2\}$ is the interference power on the second antenna, and $\sigma^2 = E\{|n_0|^2\} = E\{|n_1|^2\}$ is the noise power.

If the interference is uncorrelated, i.e. $E\{u_0 u_1^*\} = E\{u_1 u_0^*\} = 0$, then det(R) can be approximated as:

$$\det(R) = r_{0,0} r_{1,1} = (\sigma_{u_0}^2 + \sigma^2)(\sigma_{u_1}^2 + \sigma^2) \approx \sigma_{u_0}^2 \sigma_{u_1}^2 \quad \text{Eq. (7)}$$

assuming $\sigma_i^2 \gg \sigma^2$.

On the other hand, if the interference is fully correlated, i.e., if $E\{u_0 u_1^*\} = E\{u_1 u_0^*\} = \sigma_u^2$, then det(R) becomes very small:

$$\det(R) = r_{0,0} r_{1,1} - r_{0,1} r_{1,1} = (\sigma_u^2 + \sigma^2)^2 - \sigma_u^4 \approx 0 \quad \text{Eq. (8)}$$

Since the interference power can be very small too, the determinant of $\hat{R}$ alone is not a proper or reliable measure for interference correlation. The determinant of R matrix divided by the product of the diagonal matrix $\hat{R}_d$ may be a good measure. This can be defined as:

$$R_d = \begin{bmatrix} r_{0,0} & 0 \\ 0 & r_{1,1} \end{bmatrix} \quad \text{Eq. (9)}$$

The determinant calculation for impairment covariance matrix of larger dimensions may be more complicated than for the 2×2 case. For example, the determinant for the 3×3 case is given by:

$$\det(R) = r_{0,0} r_{1,1} r_{2,2} + r_{0,1} r_{1,2} r_{2,0} + r_{0,2} r_{1,0} r_{2,1} - r_{0,0} r_{1,2} r_{2,1} - r_{0,1} r_{1,0} r_{2,2} - r_{0,2} r_{1,1} r_{2,0} \quad \text{Eq. (10)}$$

$$\det(R_d) = r_{0,0} r_{1,1} r_{2,2} \quad \text{Eq. (11)}$$

However, no matter how large the matrix dimension, the determinant ratio defined above measures the interference correlation and thus the potential IRC gain. If interference is fully correlated, then the determinant ratio has a value close to 0. On the other hand, if the interference is uncorrelated, the determinant ratio is equal to 1 since all elements of R that are not on the main diagonal become 0 so that det(R)=det $(R_d)$.

In some embodiments, the interference correlation metric is calculated from an estimated covariance matrix with estimation errors. The accuracy of the estimated matrix may be degraded by channel estimation error and the limited number of impairment samples that are used to estimate the covariance matrix. Therefore, the interference correlation metric which is calculated from the estimated impairment covariance matrix, is also inaccurate and this inaccuracy should be considered when deciding whether IRC should be enabled or disabled. Channel estimation errors may be introduced into the estimated covariance matrix through impairment samples $\tilde{v}(k,l)$ which are calculated by multiplying the reference symbols with the corresponding channel matrix estimate $\hat{H}(k,l)d(k,l)$ and subtracting the product from the received signal, as follows.

$$\tilde{v}(k,l) = y(k,l) - \hat{H}(k,l)d(k,l) \quad \text{Eq. (12)}$$

The number of samples is determined by the number of reference signals within a resource block (RB) of transmission; statistically the more samples that can be averaged, the more accurate is the estimated covariance matrix since the covariance matrix is estimated by averaging the outer-products of the $N_{RS}$ impairment samples within a resource block $$\hat{R} = \frac{1}{N_{RS}} \sum_{(k,l) \in \Omega} \tilde{v}(k,l) \tilde{v}^H(k,l) \quad \text{Eq. (13)}$$

Using more samples can not only improves the statistical accuracy, but also help to suppress channel estimation error, which is sometimes called processing gain.

Due to the impairment covariance matrix estimation error, the interference correlation metric calculated is preferably qualified by comparing it to a threshold value which is dependent on the expected accuracy of $\hat{R}$ matrix. If the accuracy of the estimated covariance matrix is high, then IRC should be used more frequently which means a relatively large determinant ratio, meaning lower interference correlation, justifies the use of IRC. If, on the other hand, the accuracy of the estimated covariance is low, then IRC should be used more cautiously, meaning that the determinant ratio should be relatively low, or only larger interference correlation would justify the use of IRC.

The channel estimation error is dependent on the type of reference signals that are used for channel estimation. The LTE/LTE-Advanced standard provides for two types of reference signals that can be used for signal demodulation, including a cell specific reference signal (CRS) common to all users in cell, and a user device specific reference signal (DM-RS) that is specific to a particular user device. An LTE compliant user device is expected to support both CRS and DM-RS based estimation depending on the transmission mode (TM) assigned by the network. For example, codebook based close-loop spatial multiplexing (TM4) is based on CRS whereas non-codebook based beamforming (TM9) is based on DM-RS. Simulations by the inventors using CRS or DM-RS show that IRC gain is larger using CRS than DM-RS. CRS not only has higher density but also a more optimized 2D pattern compared to CRS; the CRS pattern is optimized for channel estimation whereas DM-RS is designed to balance the need of channel estimation and code domain multiplexing of DM-RS sequences to support more antenna ports. Through these simulations, the inventors realized that IRC should be used more cautiously when DM-RS is used for estimation.

FIG. 6 shows example available look up tables (LUTs) for interference correlation thresholds. There is a separate LUT for each combination of reference signal and modulation combination $LUT_{ij}$ and each LUT contains multiple threshold values $LUT^k_{ij}$ where k=1,2, . . . N is the index for different SINR values.

Figure 7:
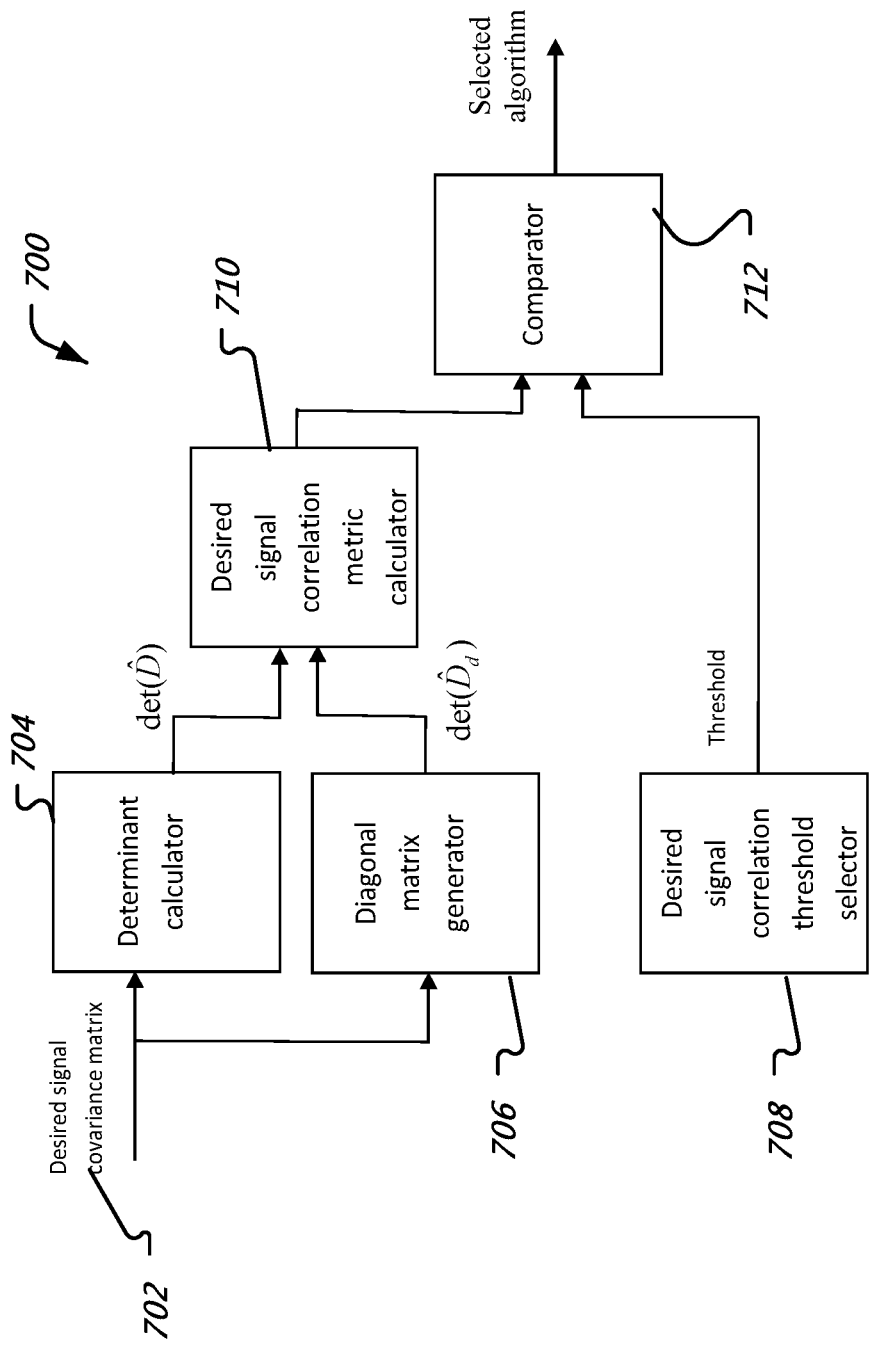
FIG. 7 shows an example of a detection algorithm selector.

FIG. 7 shows an example apparatus 700 of an algorithm selector, comprising a desired signal covariance matrix calculator 702, a determinant calculator 704, a diagonal matrix generator 706, a threshold selector 708 and a correlation metric calculator 710. The processing in the algorithm selector is similar to that of IRC control unit, e.g., comparator 712 may operate similar to comparator 508, except that the metric indicates the correlation of the desired signal instead of the interference. Since the parameters such as modulation scheme and pre-coding matrix of the desired signal are known to the receiver, the covariance matrix of the desire signal can be estimated using samples outside of one resource block as long as the averaged signals have the same statistical properties which means that, in principle, the desired signal covariance matrix can be estimated more accurately than the impairment covariance matrix.

Figure 8:
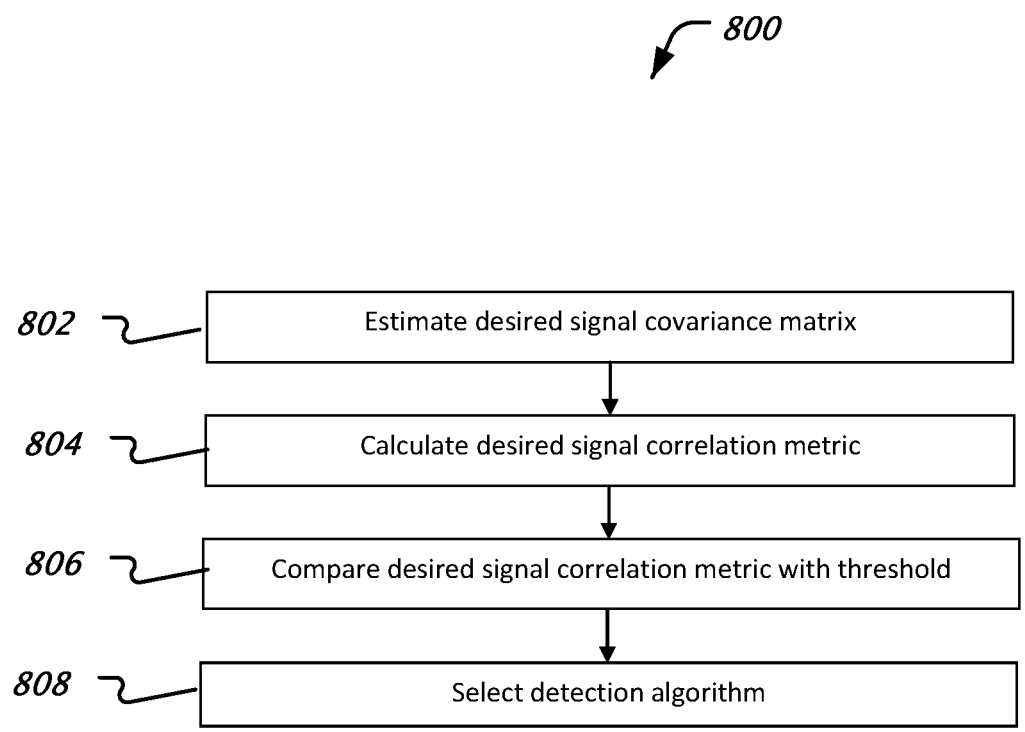
FIG. 8 shows an example flowchart of selecting detection algorithm based on desired signal correlation.

FIG. 8 shows an example detection algorithm selection workflow 800. The workflow 800 may be implemented by a communication receiver equipped with a memory and a processor or dedicated hardware logic to implement each operation. First, a desired signal covariance matrix D is estimated (802) by averaging the products $\hat{H}(k,l)\hat{H}^H(k,l)$ of the channel matrix at reference signal subcarriers, accumulating the products and then averaging over N reference signal subcarriers.

$$\hat{D} = \frac{1}{N} \sum_{(k,l) \in (RS)} \hat{H}(k,l)\hat{H}^H(k,l) \qquad \text{Eq. (14)}$$

After the desired signal covariance matrix has been calculated, a desired signal correlation metric is calculated (804) using the same procedure as used for the interference correlation metric, i.e., the desired signal correlation metric is defined as the ratio of determinant of $\hat{D}$ over the determinant of $\hat{D}_d$, where $\hat{D}_d = \text{diag}(\hat{D})$.

The desired signal correlation metric is given by:

$$M_d = \frac{\det(\hat{D})}{\det(\hat{D}_d)} \qquad \text{Eq. (15)}$$

In some embodiments, a desired signal correlation threshold is selected from pre-defined values stored in a lookup table (LUT) corresponding to different spatial correlations of the desired signal. For example, threshold values may correspond to low, medium and high correlation of desired signal as specified by the 3GPP LTE/LTE-Advanced standard. If the correlation metric is smaller than the threshold, as compared at 806, a linear detection algorithm such as MMSE may be selected (808). Otherwise, an ML type algorithm may be selected.

Figure 9:
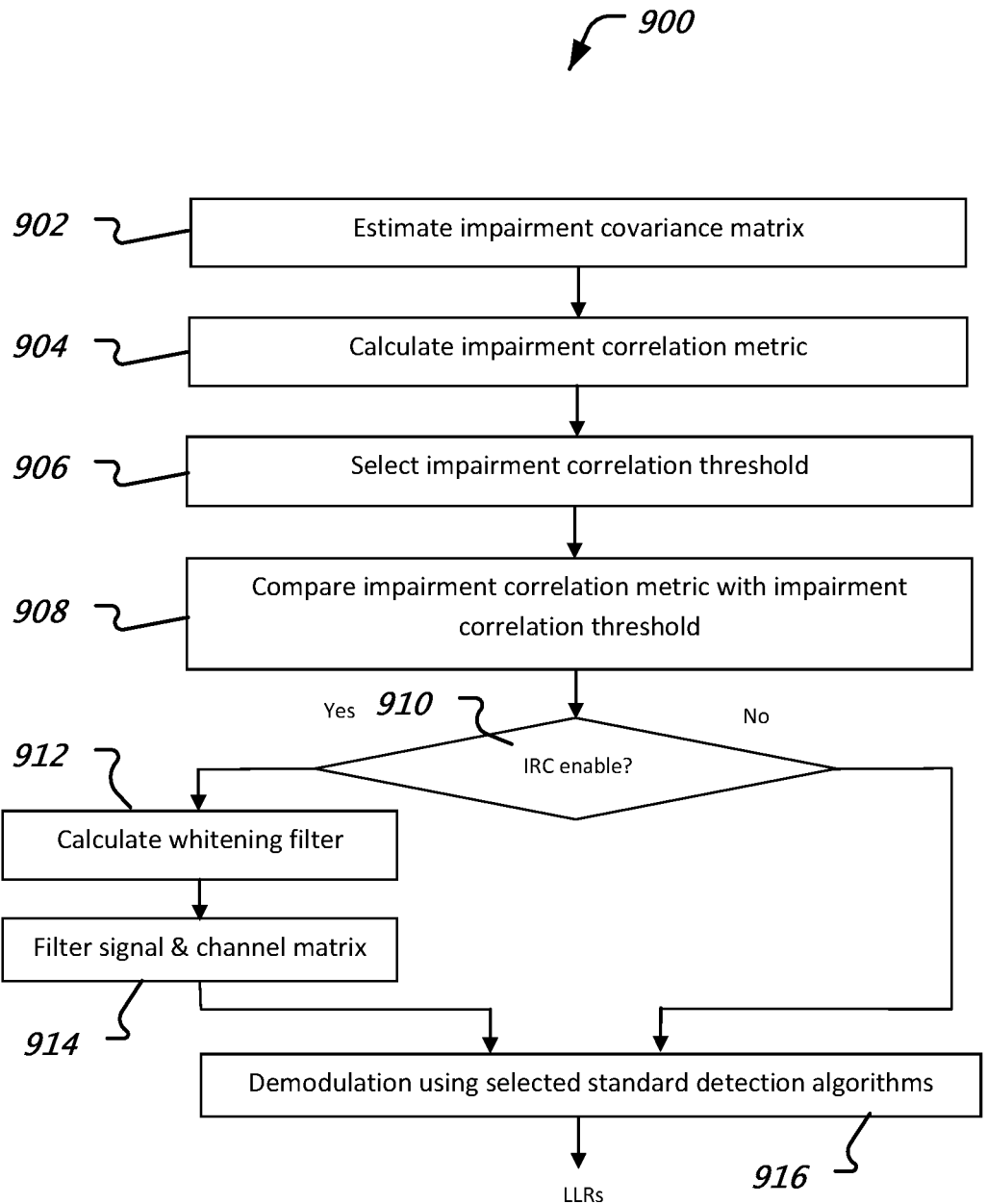
FIG. 9 shows an example flowchart of adaptively applying IRC for demodulation using whitening filter based on unified IRC receiver structure.

FIG. 9 shows an example workflow 900 for adaptive enabling and disabling of IRC. The inputs to the demodulator could include received signal vectors, channel matrix estimates, reference symbols for the reference signal subcarriers, etc. First, an impairment covariance matrix is estimated (902). An interference correlation metric is calculated (904) which may be the ratio of the determinant of the impairment covariance and the determinant of the diagonal matrix $\hat{R}_d$. A threshold is selected (906) from one of the pre-stored LUTs which is compared (908) to the interference correlation threshold metric. If the metric is smaller than the threshold, IRC is enabled (910). Otherwise IRC is disabled. If IRC is enabled, a whitening filter is calculated (912) from the impairment covariance matrix estimate and the signal and channel matrix are filtered (914). Output of the whitening filter is passed to the selected standard algorithm for signal demodulation (916).

Figure 10:
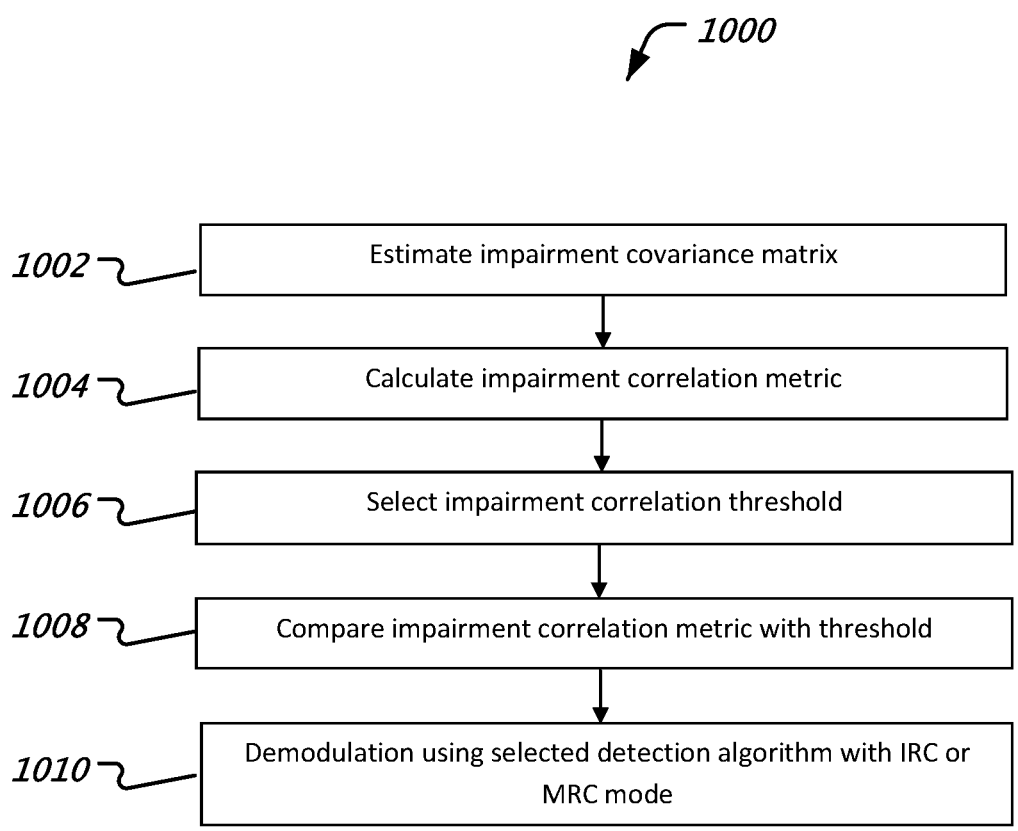
FIG. 10 shows an example flowchart of adaptively applying IRC for demodulation using individual detection algorithms supporting IRC and non-IRC mode.

FIG. 10 shows an example method 1000 where, if the receiver structure is based on separate detection algorithms supporting IRC and non-IRC mode, then the IRC enable/disable control signal is passed to the selected detection algorithm to either enable or disable IRC within the selected detection algorithm.

The estimation of both the desired signal covariance matrix (1002) and impairment covariance matrix (1004) includes the computation of a determinant. Computing determinant of a covariance matrix with large dimensions (e.g., three or more rows) is not a trivial task such as for a 4×4 or even 3×3 matrix (see Eq. 10). To reduce computation load, in some embodiments, a Cholesky decomposition of the covariance matrix can be performed before the interference correlation metric is calculated (1004). Since the covariance matrix is now expressed as the product of two diagonal matrices and determinant of a diagonal matrix is simply the product of the main diagonal elements, the determinant of the covariance matrix can be easily calculated as the square of the product.

Let $\hat{U}$ be the Upper triangular Cholesky factor matrix whose determinant is the product of its main diagonal elements.

$$\hat{R} = \hat{U}\hat{U}^H \qquad \text{Eq. (16)}$$

Once the R matrix is factorized as in Eq.16, its determinant can be calculated as square of $\det(\hat{U})$:

$$\det(\hat{R}) = \det(\hat{U})\det(\hat{U}^H) = |\det(\hat{U})|^2 \qquad \text{Eq. (17)}$$

Next, an impairment correlation threshold is selected (1006) as described previously, a comparison is made between the impairment correlation metric and the threshold (1008) and demodulation using the selected detection algorithm with IRC or standard mode is performed (1010).

For their experimentation, the inventors found out that the IRC gain, i.e. MMSE-IRC over MMSE, ML-IRC over ML, etc., depends on the accuracy of impairment covariance matrix or (R matrix estimation in short).

As described in this document, R matrix is defined in statistical term which means it cannot be exactly estimated in practice due to the limited number of impairment samples. Another reason why R matrix cannot be estimated accurately is that channel estimation results are used to calculate impairment samples, but channel estimation itself is inaccurate or very inaccurate in practice. In fact, in the hypothetical cases that the R matrix could be estimated accurately with negligible errors, it may make sense to use IRC unconditionally without being concerned about the performance loss of using IRC since it won't cause any loss. Under this assumption, the worst case is that using IRC won't gain any performance such as in the cell center where the interference from adjacent cells is not of a significant concern.

One rationale to adaptively apply IRC is because the estimated R matrix is inaccurate, and in many cases, such as when the received signal is contaminated by strong interference, may be very inaccurate. However, it is beneficial to suppress interference even if R matrix is inaccurate; as long as the benefit of interference suppression using IRC overweigh the signal distortion caused by using inaccurate R matrix, IRC still be should be used. Therefore, the inventors found out that it would be very useful to find a method which can reliably indicate whether or not IRC is most likely to gain performance.

One advantageous aspect of the disclosed technique is to determine the true degree of interference correlation given an inaccurate impairment covariance matrix estimate. With the understanding that IRC is particularly useful (e.g., high gain) when interference is correlated, the inventors realized that it would be beneficial to determine the degree of the interference correlation given an inaccurate impairment covariance matrix. The determinant of the impairment covariance matrix provides insight into determining the interference correlation. An ad hoc or intuitive way would be to consider the non-main-diagonal elements of the impairment covariance matrix. However, that method does not necessarily indicate the true interference correlation, especially when the impairment matrix is 3×3, 4×4 or higher dimension in which case there are too many off-diagonal elements to consider. Besides, even if the off-the-diagonal elements are very small, the interference can still be uncorrelated if the interference power level is low. What is really useful is to find a single value that is mathematically related to the correlation of interference.

Using linear algebra, it is known that a singular matrix has a zero determinant. In a singular matrix, at least one column can be expressed as linear combination of other columns. This same applies to the rows. An impairment covariance matrix will typically never be singular since there are thermal noise terms on the main diagonal. However, the impairment covariance matrix can be very close to singular if there are a few dominant interferers. Another idea is to normalize the determinant by the product of the main diagonal elements which is in turn the determinant of the diagonal matrix derived from the impairment covariance matrix. The determinant ratio gives us a very sound and elegant indication of the interference correlation as explained in the disclosure; if interference is totally uncorrelated, then the ratio is approaching 1, if the interference is totally correlated the ratio is approaching 0. In general if the interference is correlated to some extent, then the ratio is somewhere between 0 and 1.

When using the determinant as a measure for interference correlation, the next question is how accurate is the estimated impairment covariance matrix. This question is important since if the covariance matrix is very inaccurate measure, then using IRC may harm as a net effect. Therefore, it may be beneficial to use thresholds organized as multiple LUTs, one for each (reference signal type, modulation) combination. As mentioned, reference signal type could affect R matrix accuracy significantly. So does the modulation scheme; when receiving a 64-QAM signal, the receiver requires a much higher SINR which means the channel estimation quality is good and R matrix accuracy is correspondingly high and vice versa.

Figure 11:
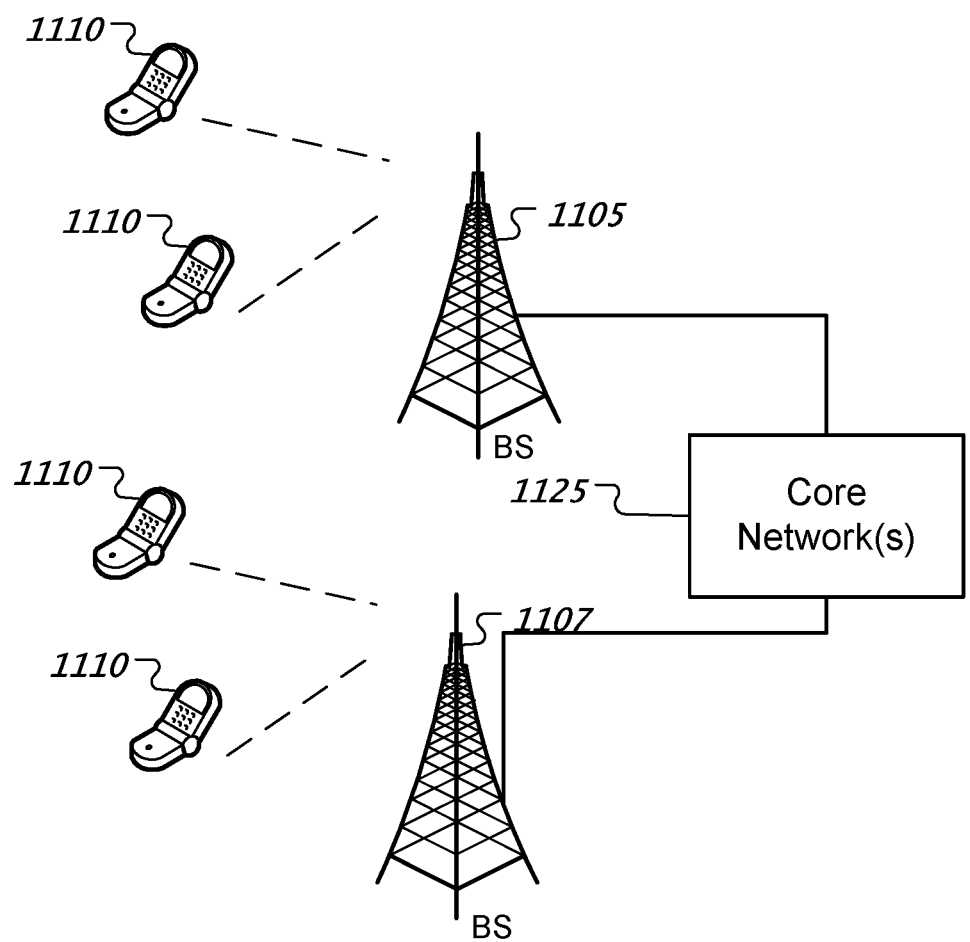
FIG. 11 shows an example of a wireless communication system.

FIG. 11 shows an example of a wireless communication system. A wireless communication system can include one or more base stations (BSs) 1105, one or more wireless devices 1110 and an access network 1125. A base station 1105 can provide wireless service to wireless devices 1110 in one or more wireless sectors. In some implementations, a base station 1105 includes directional antennas to produce two or more directional beams to provide wireless coverage in different sectors.

The access network 1125 can communicate with one or more base stations 1105. In some implementations, the access network 1125 includes one or more base stations 105a, 105b. In some implementations, the access network 1125 is in communication with a core network (not shown in FIG. 1) that provides connectivity with other wireless communication systems and wired communication systems. The core network may include one or more service subscription databases to store information related to the subscribed wireless devices 1110. A first base station 1105 can provide wireless service based on a first radio access technology, whereas a second base station 105b can provide wireless service based on a second radio access technology. The base stations 1105 may be co-located or may be separately installed in the field according to the deployment scenario. The access network 1125 can support multiple different radio access technologies.

Various examples of wireless communication systems and access networks that can implement the present techniques and systems include, among others, wireless communication systems based Code Division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Long-Term Evolution (LTE), and Worldwide Interoperability for Microwave Access (WiMAX). In some implementations, a wireless communication system can include multiple networks using different wireless technologies. A dual-mode or multi-mode wireless device includes two or more wireless technologies that could be used to connect to different wireless networks. In some implementations, a wireless device can support Simultaneous Voice-Data Operation (SVDO).

Figure 12:
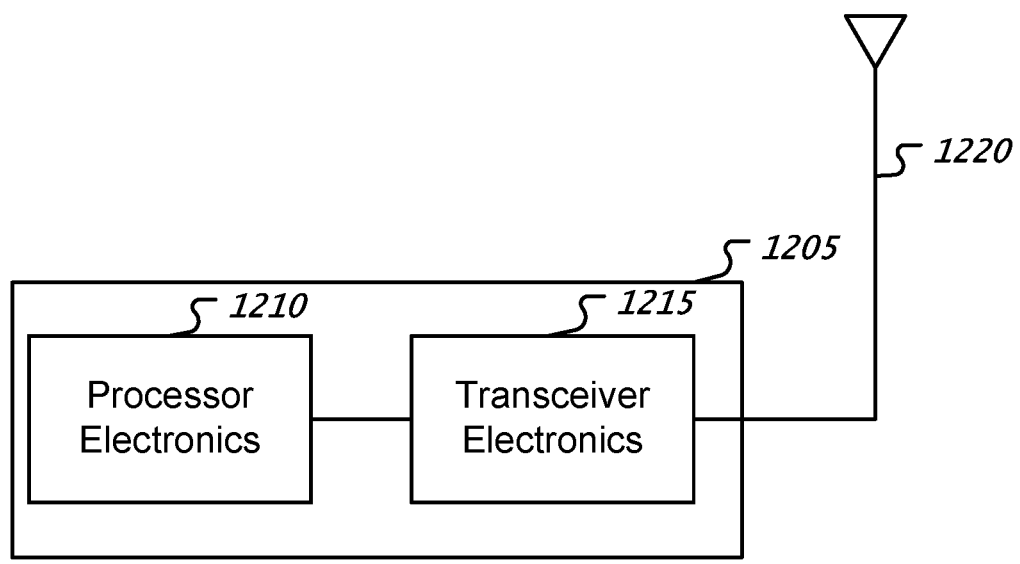
FIG. 12 shows an example of a radio station architecture.

FIG. 12 is a block diagram representation of a portion of a radio station 1205. A radio station 1205 such as a base station or a wireless device can include processor electronics 1210 such as a microprocessor that implements one or more of the wireless techniques presented in this document. The radio station 1205 can include transceiver electronics 1215 to send and/or receive wireless signals over one or more communication interfaces such as antenna 1220. The radio station 1205 can include other communication interfaces for transmitting and receiving data. Radio station 1205 can include one or more memories configured to store information such as data and/or instructions. In some implementations, the processor electronics 1210 can include at least a portion of the transceiver electronics 1215. In some embodiments, at least some of the disclosed techniques, modules or functions are implemented using the radio station 1205.

FIG. 13 shows an example of a MIMO receiver with a unified IRC unit. This example generally corresponds to FIG. 4 in the inventors' previous patent filing PCT/CA2015/051234, which is incorporated by reference herein in its entirety.

FIG. 13 shows an exemplary embodiment of a unified MIMO IRC demodulator 1300, comprising an algorithm control unit 1302, an IRC control unit 1304, a whitening filter generation unit 1306 and a whitening filter unit 1308. Based on the operating conditions, the algorithm control unit 1302 selects the optimum algorithm, MRC (maximum ratio combining) 1314, MMSE (minimum mean square error) 1316, ML (maximum likelihood) 1318, SD (sphere decoding) 1320, NAICS (network assisted interference cancellation system) MMSE-SIC 1324, and NAICS ML 1326 etc., collectively called standard detection algorithms 1312. The decision about which algorithm to select may be based on SINR and other signal parameters. The IRC control unit 1304 controls the operation of IRC unit 1310 and calculates an interference reduction metric M (similar to $M_{IR}$) and compares the metric with a threshold T (similar to $T_{IR}$) to determine if IRC should be enabled. In some embodiments, the interference reduction metric may be related to a value of impairment spatial correlation in the signals received at different antennas.

In some embodiments, the whitening filter generation unit 1306 calculates a whitening filter by performing a Cholesky decomposition of the inverse of the impairment covariance matrix. The whitening filter unit 1308 then applies the whitening filter to the received signal and channel matrix. The use of the whitening filtering generation unit is controlled via a switch 1324 under the control of the IRC control unit 1304.

In some embodiments, the IRC control unit 1304 calculates an interference reduction ratio based on the estimated impairment correlation matrix and compares the metric with a threshold to determine if IRC should be applied. The threshold T can be chosen based on the result of simulations, while taking the values of other relevant signal parameters into account such as the estimated SINR, the modulation scheme, and so on. For example, the threshold T may be a system-wide constant or may be periodically adjusted based on changes in the wireless network.

In some embodiments, the whitening filter can be generated by first computing the Cholesky decomposition of the impairment covariance matrix and then computing the inverse of the triangular Cholesky factor matrix followed by conjugate-transposing the result. This method can be used to reduce the computation compared to first computing the inverse of R matrix and then performing Cholesky decomposition of the inverse. This is because inverting a triangular matrix is much simpler than inverting a non-triangular matrix. An additional benefit of this method is that, after the Cholesky decomposition of the impairment matrix has been computed, the determinant of the impairment covariance matrix is readily obtained by computing the product of the main diagonal entries of the Cholesky factor matrix and squaring the result. The determinant of the impairment covariance matrix is then used for calculating the interference reduction metric.

In various embodiments, the Cholesky factorization that is calculated using either upper or lower triangular factor matrix can be used to obtain the whitening filter. In both cases, the impairment will be de-correlated whether upper or lower triangular matrix is used. If the power levels of the impairment on receive antennas are very different, however, using upper or lower triangular matrix will have a different effect on the received signals. Consider the case of using 2 receive antennas with:

$$y = [y(0), y(1)]^T,$$

$$U = \begin{bmatrix} u_{00} & u_{01} \\ 0 & u_{11} \end{bmatrix},$$

$$L = \begin{bmatrix} l_{00} & 0 \\ l_{10} & l_{11} \end{bmatrix} \text{ and }$$

$$R = \begin{bmatrix} r_{00} & r_{01} \\ r_{10} & r_{11} \end{bmatrix}$$

Eq. (18)

In case when upper-triangular whitening filter is used to whiten received signal $y_w$ is:

$$y_w = \begin{bmatrix} l_{00} & 0 \\ l_{10} & l_{11} \end{bmatrix} \begin{bmatrix} y(0) \\ y(1) \end{bmatrix} = \begin{bmatrix} l_{00}y(0) \\ l_{10}y(0) + l_{11}y(1) \end{bmatrix}$$

Eq. (19)

From Equations 18 and 19, it can be seen that in case of upper-triangular filter, the signal $y_w(1)$ is the scaled version of the original signal $y(1)$ whereas the signal $y_w(0)$ is the linear combination of $y(0)$ and $y(1)$. Entries $l_{xy}$ represent whitening filter coefficients. Similarly, in case of lower triangular filter, $y_w(0)$ is the scaled version of $y(0)$, whereas $y_w(1)$ is the linear combination of $y(0)$ and $y(1)$. In some embodiments, if the impairment power on the second antenna is smaller, i.e. if $r_{11} < r_{00}$, then upper-triangular filter may be used; otherwise lower triangular filter is used. This selectivity of the application of whether to use the upper or the lower triangular filter can be advantageously used to minimize the distortion to the received signal branch that has better quality.

In one aspect, the performance gain of IRC can be measured in terms of SINR to achieve a certain normalized throughput (for example 70%) with and without using IRC. The figure of IRC gain depends on many factors, including location of the mobile terminal, dominant interference power ratio (DIP), which is the ratio of each interferer's power level to the total interference plus thermal noise power, the estimation accuracy of channel, and impairment covariance matrix, etc. The IRC gain also improves very significantly with increased number of receive antennas, because using more receive antennas enables the receiver to more fully de-correlate the impairment and to reduce the effects of interference to a larger extent.

In some embodiments, if a mobile terminal has only 2 receive antennas, real-valued impairment covariance matrix can be generated by splitting the in-phase (I) and quadrature (Q) component of each impairment sample $\bar{e}_{l,k} = [\text{re}(e_{l,k})^T, \text{im}(e_{l,k})^T]^T$ where $\text{re}(e_{l,k}) = [\text{re}(e_{l,k}(0), \text{re}(e_{l,k}(1), \ldots \text{re}(e_{l,k}(N_{RX}-1)]^T$, $\text{im}(e_{l,k}) = [\text{im}(e_{l,k}(0), \text{im}(e_{l,k}(1), \ldots \text{im}(e_{l,k}(N_{RX}-1)]^T$, $e_{l,k} = y_{l,k} - Hd_{l,k}$ and $(l,k) \subset \Psi_{RS}$. It can be seen that $\bar{e}_{l,k}$ is a $2N_{RX} \times 1$ vector. Averaging these vector samples yields the $2N_{RX} \times 2N_{RX}$ real-valued impairment covariance matrix $\bar{R}$:

$$\bar{R} = \frac{1}{|\Psi_{RS}|} \sum_{(l,k) \in \Psi_{RS}} \bar{e}_{l,k} \bar{e}_{l,k}^T$$

Eq. (20)

Using I-Q splitting, the impairment correlation in both antenna and I-Q domain are captured which is especially beneficial when the number of receive antennas is small such as 2. The whitening filter is generated from $\bar{R}$ by computing the Cholesky decomposition of $\bar{R}$ $$\bar{R}^{-1} = \bar{U}^T \bar{U}$$

Eq. (21)

Before the whitening filter $\bar{U}$ can be applied to the received signal, the original complex-valued MIMO system y=Hx+n is transformed to its equivalent real-valued MIMO i system: $\bar{y} = \bar{H}\bar{x} + \bar{n}$, where $$\bar{H} = \begin{bmatrix} \text{re}(H) & -\text{im}(H) \\ \text{im}(H) & \text{re}(H) \end{bmatrix},$$

$$\bar{y} = \begin{bmatrix} \text{re}(y) \\ \text{im}(y) \end{bmatrix},$$

$$\bar{x} = \begin{bmatrix} \text{re}(x) \\ \text{im}(x) \end{bmatrix},$$

$$\bar{n} = \begin{bmatrix} \text{re}(n) \\ \text{im}(n) \end{bmatrix},$$

Eq. (22)

The whitened received signal $\bar{y}_w$ and channel matrix $\bar{H}_w$ are given by $$\bar{y}_w = \bar{U}\bar{y} \text{ and } \bar{H}_w = \bar{U}\bar{y}.$$

Eq. (23)

This method of spatial whitening using the real-valued impairment covariance matrix is especially convenient when the SESD (Schnorr Euckner Sphere decoder) algorithm is selected, because the SESD algorithm is also based on converting the complex MIMO to its equivalent real system before detecting. After the whitening operation, the above-described MIMO system has already been converted to a real system, thereby providing partial results for the SESD implementation.

Some embodiments that use the technology discloses herein can be described as following clauses.

Clause 1. A method of adaptively applying interference rejection combining (IRC) for signal demodulation, comprising: determining an interference correlation metric based on the determinant of an estimated impairment covariance matrix the accuracy of which is degraded by channel estimation errors and limited number of samples used to estimate the impairment covariance matrix; choosing an interference correlation threshold based on the type of reference signals used for impairment covariance matrix estimation, the modulation used by the desired signal and signal to interference plus noise ratio (SINR); determining if IRC should be used for signal demodulation by comparing the interference correlation metric with the selected threshold; determining a desired signal correlation metric based on the determinant of an estimated desired signal covariance matrix to select a detection algorithm from a plurality of supported algorithms.

Clause 2. A method of Clause 1, further including: estimating an impairment covariance matrix for signals received at multiple receiving antennas; computing the determinant of the impairment covariance matrix; generating a diagonal matrix which has the same main diagonal as the impairment covariance matrix; and computing an interference correlation metric as the ratio between the determinant of the impairment covariance matrix and the determinant of the diagonal matrix.

Clause 3. A method of Clause 2, wherein the determinant of the impairment covariance matrix is computed by performing Cholesky decomposition of the matrix, computing the product of the main diagonal elements of the Cholesky factor matrix and then squaring the product.

Clause 4. A method of Clause 2, wherein the ratio between the determinant of the impairment covariance matrix and the determinant of the diagonal matrix is related to interference correlation; a smaller ratio indicates a higher interference correlation and larger potential IRC gain, and a larger determinant ratio indicates a lower interference correlation and smaller potential IRC gain.

Clause 5. A method of Clause 1, wherein choosing an interference correlation threshold comprises selecting a lookup table (LUT) based on the reference signal type used for channel and impairment covariance matrix estimation and modulation used by the desired signal, and choosing a threshold value from the selected LUT based on the estimated SINR value.

Clause 6. A method of Clause 5, wherein a separate LUT is used for each combination of reference signal type and modulation, and wherein reference signal types include Cell-specific Reference Signals (CRS) and Demodulation Reference Signals (DM-RS) used in the LTE/LTE-Advanced standard.

Clause 7.1 A method of Clause 5, wherein the interference correlation thresholds can be obtained by simulating the performance for each reference signal type and modulation combination at a specific SINR using different trial threshold values and choosing the value corresponding to the lowest BER and/or BLER.

Clause 7.2 A method of Clause 1, wherein a desired signal covariance matrix is estimated by computing the product of the desired signal channel matrix and its conjugate-transpose at reference signal subcarriers, accumulating the matrix products and dividing the accumulated products by the number of reference signals.

Clause 8. A method of Clause 1, wherein the desired signal correlation metric can be computed as the ratio of the determinant of desired signal covariance matrix and the determinant of the diagonal matrix having the same main diagonal as the desired signal covariance matrix.

Clause 9. A method of Clause 8, wherein the smaller the desired signal correlation metric, the more correlated is the desired signal and the worse is the performance of linear detection algorithm such as MMSE compared to the performance of an ML algorithm and the smaller is the IRC gain if a linear detection algorithm is selected and IRC is enabled.

Clause 10. A method of Clause 1 wherein a plurality of threshold values are pre-determined and stored in a lookup table (LUT), and wherein each threshold value can be obtained by simulating different threshold values at low, medium and high MIMO channel correlation.

Clause 12. A method of Clause 1, wherein IRC is enabled if the received signal is first whitened and the whitened signal is detected by a standard algorithm, or alternatively if the IRC mode implemented within the selected detection algorithm is used.

Clause 13. A wireless demodulator to adaptively apply interference rejection combining to signal demodulation, comprising: an impairment covariance matrix estimator, an IRC control unit to decide if IRC should be used to demodulate current signal based on the determinant of the impairment covariance matrix, a desired signal covariance matrix estimator, a detection algorithm selector to choose one of the plurality of detection algorithms based on the determinant of the desired signal covariance matrix, a whitening filter generation unit and a whitening filter followed by a plurality of standard detection algorithms or, alternatively, separate detection algorithms supporting both standard and IRC mode operation, control apparatus to route the IRC enable/disable control signal to the relevant points of the demodulator to either enable or disable IRC as part of the demodulation process.

Clause 14. A wireless demodulator of Clause 13, wherein the impairment covariance matrix estimator comprises a matrix-vector multiplier and a vector subtraction unit to compute interference plus noise samples at reference signal subcarriers, and an outer-product generator to compute impairment outer-product samples and an accumulator and a divider to generate the estimated impairment covariance matrix.

Clause 15. A wireless demodulator of Clause 13, wherein the IRC control unit comprises a determinant calculator, a diagonal metric generator, an interference correlation threshold selector, and a comparator.

Clause 16. The IRC control unit of Clause 13, wherein the determinant calculator includes a Cholesky factor matrix calculator, a main diagonal product generator and a square operator.

Clause 17. The IRC control unit of Clause 15, wherein the interference correlation threshold selector includes a plurality of LUTs for different combinations of reference signal type and modulation type, and wherein each LUT includes a plurality of pre-determined threshold values.

In some embodiments, a method for demodulating received signal in a communication receiver includes receiving a radio frequency (RF) signal representing a combination of a desired signal and interference. In some embodiments, the received RF signal may be compliant with a currently practiced industry standard such as the LTE or LTE-A standard. As discussed herein, the desired signal may be a forward link or downstream signal transmission from the network, e.g., a base station or and an eNodeB or an access point. The interference may be a forward link signal from a neighboring node. The interference may represent a signal that uses a same protocol (e.g., LTE) as that of the desired signal, but may be generated by a transmitter with which the communication receiver is not synchronized or actively communicating.

The method further includes estimating, using a reference signal from the received RF signal, an estimated impairment covariance matrix. The estimation of the estimated impairment covariance matrix may use signals received at multiple antennas of the communication receiver, e.g., as discussed with respect to Eq. (10).

The method further includes determining an interference correlation metric by computing a value of determinant of the estimated impairment covariance matrix.

The method further includes selecting an interference correlation threshold based on at least one of a type of the reference signal used for estimating the impairment covariance matrix, modulation used by the desired signal and an estimate of a signal to interference plus noise ratio (SINR).

The method further includes determining, by comparing the interference correlation metric with the interference correlation threshold, whether to use interference rejection combining (IRC) for demodulation of the desired signal.

The method further includes selecting, based on a value of determinant of an estimated desired signal covariance matrix, a signal detection algorithm for use by the receiver during demodulation of the desired signal.

In some embodiments, the interference correlation metric is determined by generating a diagonal matrix that has the same main diagonal as the impairment covariance matrix and by determining the interference correlation metric as the ratio between the value of determinant of the impairment covariance matrix and a value of determinant of the diagonal matrix. As disclosed herein, in some embodiments, the determinant computation may be achieved by performing a Cholesky decomposition of the impairment covariance matrix and by computing a product of main diagonal elements of the Cholesky factor matrix and then squaring the product.

In some embodiments, the interference correlation threshold is determined by selecting a lookup table (LUT) based on the type of reference signal and the modulation used by the desired signal, and by choosing the interference correlation threshold from the selected LUT based on the estimate of the SINR. In some embodiments, a separate LUT is used for each combination of the type of reference signal and the modulation used by the desired signal, and wherein reference types include a Cell-specific Reference Signal (CRS) and user-equipment specific Demodulation Reference Signal (DM-RS). In some embodiments, entries of the LUT are pre-determined by simulating performance for each reference signal type and modulation combination at a specific SINR using different trial threshold values and entries of the LUT are the trial values corresponding to a lowest bit error rate (BER) or block error rate (BLER).

In some embodiments, the method further includes calculating a desired signal covariance matrix by computing products of a desired signal channel matrix and its conjugate-transpose at reference signal subcarriers, accumulating the products, and dividing the accumulated products by a number of reference signals.

In some embodiments, the method further includes computing the desired signal correlation metric as a ratio of a value of determinant of desired signal covariance matrix and a value of determinant of a diagonal matrix having a same main diagonal as the desired signal covariance matrix.

In some embodiments, a plurality of threshold values are pre-determined and stored in a lookup table (LUT), and wherein each threshold value is obtained by simulating different threshold values at low, medium and high MIMO channel correlation.

In some embodiments, the method includes enabling IRC when the received RF signal is first whitened and the whitened signal is detected by a standard algorithm, or alternatively if the IRC mode implemented within the selected detection algorithm is used.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A signal demodulation method implemented in a receiver, comprising:
    receiving a radio frequency (RF) signal representing a combination of a desired signal and interference;
    estimating, using a reference signal from the received RF signal, an estimated impairment covariance matrix;
    determining an interference correlation metric by computing a value of determinant of the estimated impairment covariance matrix;
    selecting an interference correlation threshold based on at least one of a type of the reference signal used for estimating the estimated impairment covariance matrix, modulation used by the desired signal and an estimate of a signal to interference plus noise ratio (SINR);
    determining, by comparing the interference correlation metric with the interference correlation threshold, whether or not to use interference rejection combining (IRC) for demodulation of the desired signal; and
    selecting, based on a value of determinant of an estimated desired signal covariance matrix, a signal detection algorithm for use by the receiver during demodulation of the desired signal.

2. The method of claim 1, wherein the estimation of the estimated impairment covariance matrix uses signals received at multiple receiving antennas.

3. The method of claim 1, wherein the interference correlation metric is determined by:
    generating a diagonal matrix which has a same main diagonal as that of the estimated impairment covariance matrix; and
    determining the interference correlation metric as a ratio between the value of determinant of the estimated impairment covariance matrix and a value of determinant of the diagonal matrix.

4. The method of claim 3, wherein the value of determinant of the estimated impairment covariance matrix is computed by:
    performing a Cholesky decomposition of the estimated impairment covariance matrix to obtain a Cholesky factor matrix; and
    computing a product of main diagonal elements of the Cholesky factor matrix and then squaring the product.

5. The method of claim 1, wherein the selecting the interference correlation threshold includes:
    selecting a lookup table (LUT) based on the type of reference signal and the modulation used by the desired signal, and
    choosing the interference correlation threshold from the selected LUT based on the estimate of the SINR.

6. The method of claim 5, wherein a separate LUT is used for each combination of the type of reference signal and the modulation used by the desired signal, and wherein reference types include a Cell-specific Reference Signal (CRS) and user-equipment specific Demodulation Reference Signal (DM-RS).

7. The method of claim 5, wherein entries of the LUT are pre-determined by:
    simulating performance for each reference signal type and modulation combination at a specific SINR using different trial threshold values and entries of the LUT from values corresponding to a lowest bit error rate (BER) or block error rate (BLER).

8. The method of claim 1, further including:
    calculating a desired signal covariance matrix by computing products of a desired signal channel matrix and its conjugate-transpose at reference signal subcarriers, accumulating the products; and
    dividing the accumulated products by a number of reference signals.

9. The method of claim 1, further including:
    computing a desired signal correlation metric as a ratio of the value of determinant of the estimated desired signal covariance matrix and a value of determinant of a diagonal matrix having a same main diagonal as the estimated desired signal covariance matrix.

10. The method of claim 1 wherein a plurality of threshold values are pre-determined and stored in a lookup table (LUT), and wherein each threshold value is obtained by simulating different threshold values at low, medium and high MIMO channel correlation.

11. The method of claim 1, further including:
    enabling IRC when the received RF signal is first whitened and the whitened signal is detected by a standard algorithm, or alternatively if the IRC mode implemented within the selected detection algorithm is used.

12. A wireless signal receiver apparatus to adaptively apply interference rejection combining (IRC) for signal demodulation, comprising:

an impairment covariance matrix estimator that estimates an estimated impairment covariance matrix based on signals received by the apparatus, wherein the received signals include a desired signal component and an impairment component;

an IRC control unit to decide whether to use IRC to demodulate the signals received by the apparatus based on a determinant of the estimated impairment covariance matrix;

a desired signal covariance matrix estimator that computes a desired signal covariance matrix;

a detection algorithm selector to choose one of a plurality of detection algorithms based on a determinant of the desired signal covariance matrix;

a whitening filter generation unit that generates coefficients of a whitening filter based on the estimated impairment covariance matrix, wherein the whitening filter is for de-correlating the impairment component of the received signals;

the whitening filter through which the received signals are filtered;

a plurality of standard detection algorithms or, alternatively, separate detection algorithms supporting both standard algorithms and IRC mode operation; and a control module to route an IRC enable/disable control signal to the demodulator to either enable or disable IRC.

13. The wireless signal receiver apparatus of claim 12, wherein the impairment covariance matrix estimator comprises a matrix-vector multiplier and a vector subtraction unit to compute interference plus noise samples at reference signal subcarriers, and an outer-product generator to compute impairment outer-product samples and an accumulator and a divider to generate the estimated impairment covariance matrix.

14. The wireless signal receiver apparatus of claim 12, wherein the IRC control unit comprises a determinant calculator, a diagonal metric generator, an interference correlation threshold selector, and a comparator.

15. The wireless signal receiver apparatus of claim 14, wherein the determinant calculator includes a Cholesky factor matrix calculator, a main diagonal product generator and a square operator.

16. The wireless signal receiver apparatus of claim 14, wherein the interference correlation threshold selector includes a plurality of LUTs for different combinations of reference signal type and modulation type, and wherein each LUT includes a plurality of pre-determined threshold values.

17. A wireless signal receiver apparatus comprising:
a memory storing instructions;
a processor reading the instructions from the memory and implementing a signal demodulation method, the instructions comprising:
code for receiving a radio frequency (RF) signal representing a combination of a desired signal and interference;
code for estimating, using a reference signal from the received RF signal, an estimated impairment covariance matrix;
code for determining an interference correlation metric by computing a value of determinant of the estimated impairment covariance matrix;
code for selecting an interference correlation threshold based on at least one of a type of the reference signal used for estimating the impairment covariance matrix, modulation used by the desired signal and an estimate of a signal to interference plus noise ratio (SINR);
code for determining, by comparing the interference correlation metric with the interference correlation threshold, whether or not to use interference rejection combining (IRC) for demodulation of the desired signal; and
code for selecting, based on a value of determinant of an estimated desired signal covariance matrix, a signal detection algorithm for use by the wireless signal receiver during demodulation of the desired signal.

18. The apparatus of claim 17, wherein the estimation of the estimated impairment covariance matrix uses signals received at multiple receiving antennas.

19. The apparatus of claim 17, wherein the code for determining the interference correlation metric includes:
code for generating a diagonal matrix which has a same main diagonal as that of the estimated impairment covariance matrix; and
code for determining the interference correlation metric as a ratio between the value of determinant of the estimated impairment covariance matrix and a value of determinant of the diagonal matrix.

20. The apparatus of claim 19, wherein the code for computing the value of determinant of the estimated impairment covariance matrix includes:
code for performing a Cholesky decomposition of the estimated impairment covariance matrix; and
code for computing a product of main diagonal elements of the Cholesky factor matrix and then squaring the product.

* * * * *